United States Patent [19]
Tanaka

[11] 3,875,367
[45] Apr. 1, 1975

[54] AC POWER SOURCE VOLTAGE REGULATOR INCLUDING OUTWARD VOLTAGE SLOPE CONTROL

[75] Inventor: Masaru Tanaka, Osaka, Japan

[73] Assignee: Matsushita Electric Industrial Co., Ltd., Kodoma-shi, Osaka-fu, Japan

[22] Filed: Apr. 4, 1973

[21] Appl. No.: 347,817

[30] Foreign Application Priority Data
Apr. 6, 1972 Japan.................................. 47-34985

[52] U.S. Cl............ 219/131 WR, 307/293, 321/16, 323/34, 323/106, 323/125, 219/108
[51] Int. Cl........................... B23k 9/06, G05f 1/56
[58] Field of Search........ 219/108, 114, 116, 131 R, 219/131 WR, 115; 307/293, 301; 323/34, 22 SC, 22 R, 24, 36, 106, 109, 122, 125, 126; 321/16, 18

[56] References Cited
UNITED STATES PATENTS

| | | | |
|---|---|---|---|
| 2,617,977 | 11/1952 | Large | 323/22 R |
| 2,630,557 | 3/1953 | Bixby | 323/34 X |
| 3,128,422 | 4/1964 | Brown | 323/34 X |
| 3,387,112 | 6/1968 | Guettel | 219/114 |
| 3,414,739 | 12/1968 | Paidosh | 307/301 X |
| 3,504,157 | 3/1970 | Vanderhelst | 219/114 X |
| 3,646,423 | 2/1972 | Tatematsu et al. | 323/34 X |
| 3,681,624 | 8/1972 | Allison | 307/301 |

FOREIGN PATENTS OR APPLICATIONS
452,971 2/1936 United Kingdom ............... 219/108

*Primary Examiner*—Gerald Goldberg

[57] ABSTRACT

An AC power source voltage regulator is disclosed in which the instantaneous AC power source voltage is detected by a filter and a phase shift circuit, and the output voltage of the filter is compared by a comparator with a reference voltage. A pulse generator is actuated to give the output pulse in response to the output of the comparator and of the output of a slope regulating circuit so that in response to the output pulse a thyristor inserted in a power source circuit may be triggered.

3 Claims, 6 Drawing Figures

AC POWER SOURCE VOLTAGE REGULATOR INCLUDING OUTWARD VOLTAGE SLOPE CONTROL

BACKGROUND OF THE INVENTION

The present invention relates to a voltage regulating device of the type capable of maintaining a constant effective value of the voltage applied to a welding machine even when the power source voltage fluctuates, thereby maintaining a constant welding current.

In general the quality of the articles fabricated by spot welding is largely influenced by the fluctuation of the welding current. In the conventional resistance welding the welding current conduction time that is, a time period of welding current flow is generally very short and of the order of a few cycles to tens of cycles, so that no satisfactory result cannot be attained by a closed loop control system because of the control time lag. In case of a closed loop control system, at least tens of cycles are required for welding.

In the conventional AC power source regulators, the welding current is detected by a current transformer, and the detected welding current is integrated twice by integrators so that the product of the value of the double integration multiplied by a welding current conduction time may be maintained at a constant value. However since a closed loop control circuit is employed, a control time lag occurs so that a satisfactory welding results cannot be attained. Furthermore the circuit components are complex and very expensive.

SUMMARY OF THE INVENTION

One of the objects of the present invention is therefore to provide an AC power source regulator which is capable of overcoming the problem of control time lag encountered in the conventional voltage regulators and which is simple in construction and inexpensive to fabricate and includes a slope regulating circuit for preventing the surge current.

Briefly stated according to the present invention the instantaneous value of the power source voltage which is advanced in phase by a phase shift circuit is previously detected so that when the detected value is lower than a rated voltage, the conduction angle of a thyristor is increased whereas when the detected value is higher than a rated value the conduction angle of the thyristor is decreased. As a result the effective value of the voltage applied across the primary of a welding transformer may be always maintained at a predetermined constant level. Furthermore according to the present invention the current waveform may be so controlled as to have an arbitrary slope.

The above and other objects, features and advantages of the present invention will become more apparent from the following description of one preferred embodiment thereof taken in conjunction with the accompanying drawings.

DESCRIPTION OF THE PREFERRED EMBODIMENT

Figure 1:
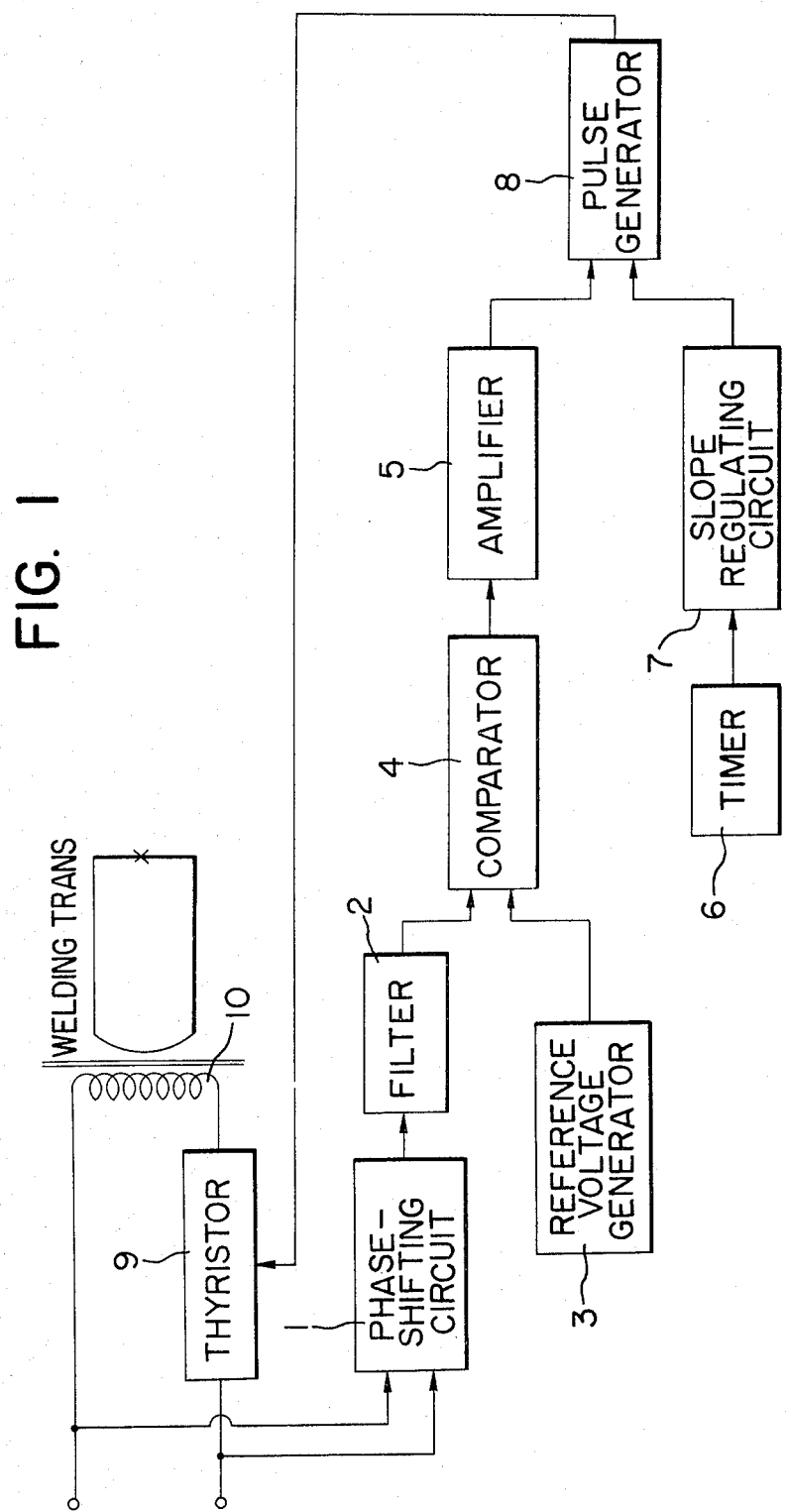
FIG. 1 is a block diagram of a device for compensating the variation in AC power source voltage.

Referring to FIG. 1 illustrating in block diagram of the preferred embodiment of the present invention, reference numeral 1 denotes a phase shift circuit for previously detecting the magnitude of a power source voltage to be controlled; 2, a low-pass or band-pass filter for cutting off a frequency higher than a cutoff frequency; 3, a reference voltage generator; 4, a comparator for comparating the output voltage of the filter 2 with a reference voltage derived from the reference voltage generator 3; 5, an amplifier for amplifying the output of the comparator 4; 6, a timer for giving the welding current conduction signal; 7, a slope regulating circuit for controlling the slope of the welding current in such a manner that when the welding current flow is started and interrupted, the welding current may be gradually increased and reduced; 8, a pulse generator for generating the pulses in response to the signals from the amplifier 5 and slope regulating circuit 7; and 9, a thyristor inserted in the primary of a welding transformer 10. Instead of the thyristor 9, an ignitron or triac may be used.

Figure 2A:
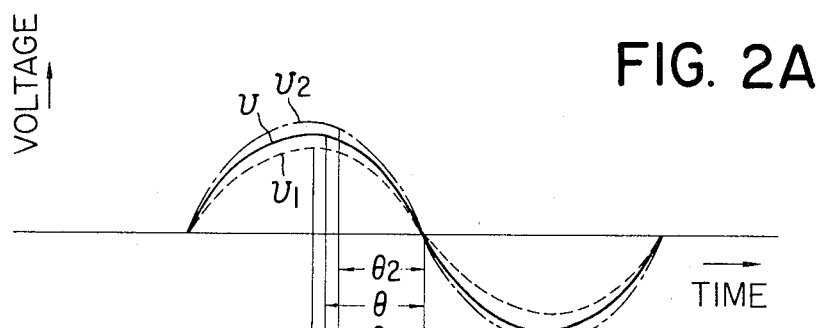
FIGS. 2A, 2B and 2C are views used for the explanation of the underlying principle of the present invention.
Figure 2B:
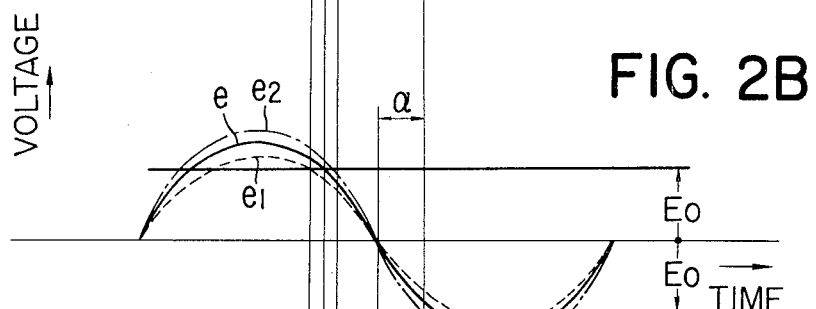
Figure 2C:
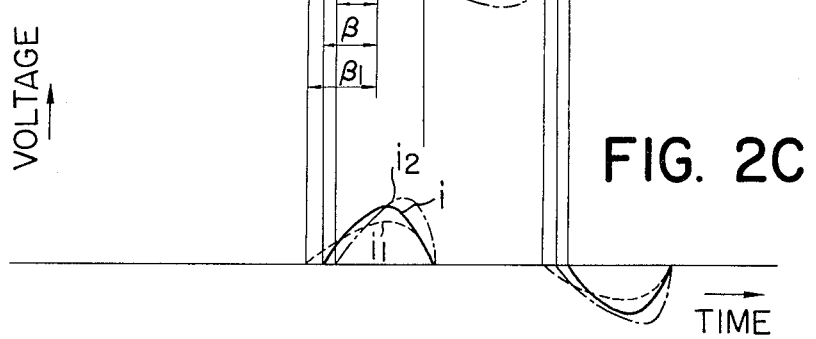

Next the underlying principle of the present invention will be described with reference to FIGS. 2A, 2B and 2C. Assume that when the rated AC power source voltage is $v$, the welding current $i$ flow at a conduction angle $\theta$. Then a conduction angle $\theta_1$ is so determined that when the power source voltage drops to $v_1$, the welding current $i_1$ may have the same effective value as the welding current $i$. In like manner an electrical conduction angle $\theta_2$ is so determined that when the voltage rises to $v_2$, the welding current $i_2$ may have the same effective value as the welding current $i$. The phase shift circuit 1 and the filter 2 are so designed that when the output voltage of the filter 2 is advanced in phase by $\alpha$ relative to the power source voltage, the output voltages $e$, $e_1$ and $e_2$ of the filter 2 may be in proportion to the voltages $v$, $v_1$ and $v_2$.

The reference voltage $E_0$ and the phase shift circuit 1 are so adjusted as to determine the leading angle $\alpha$ which may satisfy the following relation:

Power source voltage $v$:

$\alpha + \beta = \theta$, power source voltage $v_1$:

$\alpha + \beta_1 = \theta_1$, and power source voltage $v_2$:

$\alpha + \beta_2 = \theta_2$ where $\beta$, $\beta_1$ and $\beta_2$ are angles at which the output voltages $e$, $e_1$ and $e_2$ intersect the reference voltage $E_0$. The pulses are generated at these intersections to control the triggering angle of the thyristor 9 so that the welding current may be always maintained at a constant level.

More particularly, when the power source voltage drops to $v_1$, the triggering angle of the thyristor 9 is increased to $\theta_1$ whereas when the power source voltage rises to $v_2$, the triggering angle is decreased to $\theta_2$ so that the welding current may be maintained always constant regardless of the variation in the power source voltage.

Figure 3:
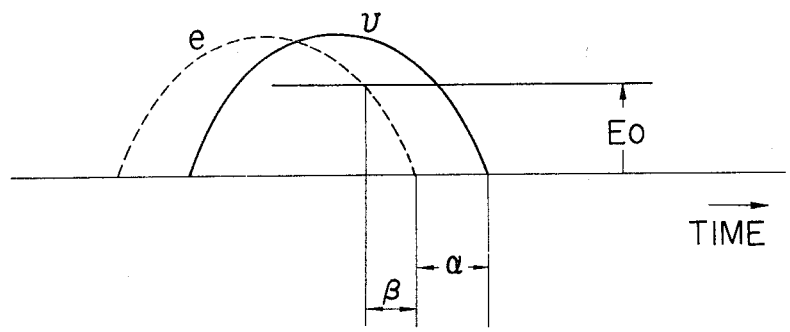
FIG. 3 is a view used also for the explanation of the underlying principle of the present invention.

However in practice it is very often required to control the slope of the welding current at the start and end of the conduction. However the slope control is difficult when the underlying principle described above is applied as will be described hereinafter with reference to FIG. 3. In FIG. 3 the output voltage $e$ of the filter 2 is shown as being advanced by the leading angle $\alpha$ with respect to the power source voltage $v$. The slope of the welding current may be controlled in the following methods:

1. The reference voltage $E_0$ is gradually increased from zero to $E_0$. However this method is not satisfactory because the triggering angle of the thyristor may be controlled only between the angle $\alpha$ and the angle $\alpha + \beta$.

2. The leading angle of the output voltage $e$ of the filter 2 with respect to the power source voltage $v$ is gradually increased from zero to $\alpha$ while the reference voltage $E_0$ is maintained at a constant level. However this method is also not satisfactory because like the method (1) the welding current is controlled only in a limited range and because the distortion of the output voltage of the filter occurs when the leading angle $\alpha$ is varied within a short time.

3. The reference voltage $E_0$ as well as the leading angle $\alpha$ are simultaneously varied. This method is also not satisfactory because of the defects described in (2).

Figure 4:
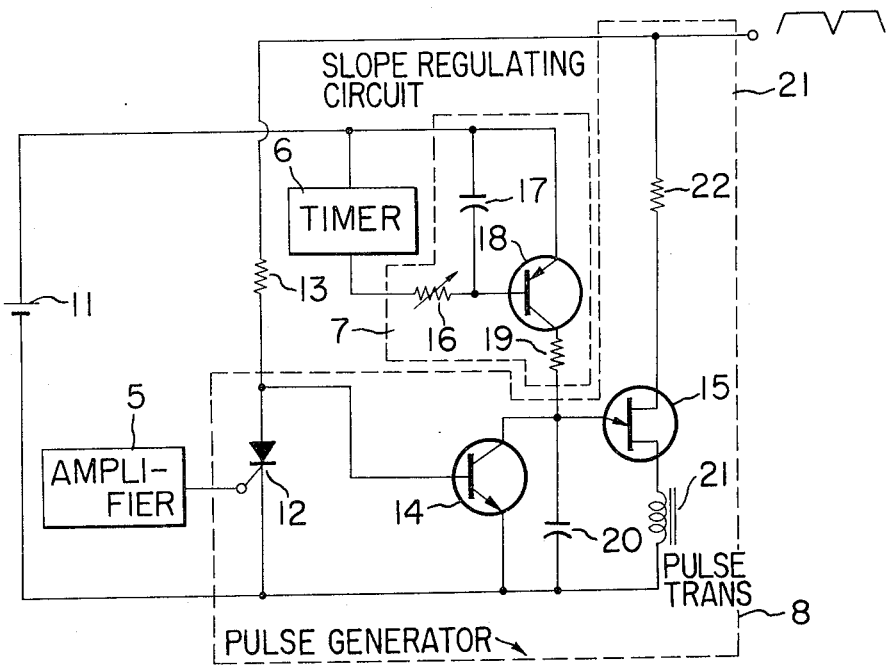
FIG. 4 is a detailed circuit diagram of the device shown in block diagram in FIG. 1.

The present invention was made to overcome the above problems and defects as will become apparent from the following description with reference to FIG. 4. In the figure, reference numeral 11 denotes a DC power source; and the amplifier 5 which amplifies the output signal of the comparator 4 gives the ON signal if and only if the reference voltage $E_0$ is higher than the output voltage of the filter 2 so that a thyristor 12 in the pulse generator generally indicated by 8 in FIG. 4 may be triggered. A resistor 13 is connected to a full-wave rectifier power source.

The pulse generator 8 comprises the thyristor 12, a transistor 14, a unijunction transistor 15, a capacitor 20, a resistor 22 and a pulse transformer 21. The base of the transistor 14 is connected to the anode of the thyristor 12 whereas the collector is connected to the emitter of the unijunction transistor 15 so that when the thyristor 12 is turned on, the transistor 14 is turned off.

The slope regulating circuit generally indicated by 7 in FIG. 4 comprises a variable resistor 16, a capacitor 17 and a transistor 18.

Next the mode of operation will be described. In response to the signal from the timer 6, the collector current of the transistor 18 changes with a time constant which is determined by the resistor 16 and the capacitor 17. The collector current of the transistor 18 charges the capacitor 20 in the pulse generator 8. When the voltage across the capacitor 20 becomes in excess of the peak point, the capacitor 20 is discharged through the pulse transformer 21 so that the output pulse may be derived. The pulse width is very closely related with the voltage charged across the capacitor 17. When the voltage across the capacitor 17 is low, the output pulse width becomes longer whereas when the voltage across the capacitor 17 is increased so that the transistor 18 is saturated, the pulse width becomes the shortest. The slope regulating circuit thus controls the width of the output pulse of the pulse generating circuit. In the steady state as soon as the reference voltage becomes in excess of the output voltage of the filter, the thyristor is triggered so that the shorting of the capacitor 20 by the transistor 14 is released. When the resistor 19 has a sufficiently low value, the output pulse may be derived from the pulse transformer immediately when the reference voltage $E_0$ becomes higher than the output voltage $e$ of the filter 2, that is when the output voltage $e$ of the filter 2 intersects the reference voltage $E_0$ as shown in FIG. 2B. Therefore in the steady state the variation in power source voltage may be compensated based upon the underlying principle of the present invention described with reference to FIGS. 2A, 2B and 2C. The up and down control until the steady state is reached may be effected mainly by the variable resistor 16 and the capacitor 17.

Since the filter 2 is used in the present invention even the variation due to the instantaneous load may be satisfactorily and easily compensated.

The advantages of the present invention may be summarized as follows:

1. Even when the variation in the power source voltage is large, the effective value of the voltage applied across the primary may be maintained always at a constant level so that the quality of the articles fabricated by the spot welding may become uniform. Thus the reliability may be remarkably improved.

2. Since the filter is used, even the variation in power source voltage due to the instantaneous load may be satisfactorily compensated.

3. Since the phase shift circuit is used, the power source voltage may be previously detected from time to time so that the precise control without any time lag may be accomplished. Therefore the welding quality may be improved.

4. The slope of the welding current may be arbitrarily controlled so that uneven magnetic flux distribution in the core of the welding transformer as well as surge current may be prevented. As a result the expulsion and surface flash may be prevented, thus resulting in the improvement of the welding quality.

As described hereinbefore when the device for compensating the variation in AC power source voltage is employed, the slope of the welding current may be arbitrarily controlled so that the device is very effective for use with a spot-welding machine because the expulsion and surface flash may be eliminated or when the product variation in the articles fabricated by welding must be eliminated or minimized.

What is claimed is:

1. An AC power source voltage regulator comprising
   a. a welding transformer,
   b. a thyristor connected in series with the primary of said welding transformer,
   c. a phase shift circuit connected to an AC power source in parallel with said primary of said welding transformer to provide an output of a phase that leads the phase of said power source,
   d. a filter for passing an AC portion of the phase shifted output of said phase shift circuit within the frequency range below a predetermined upper cut-off frequency,
   e. means providing a DC reference voltage, and a comparator for comparing the phase shifted AC output of said filter with said DC reference voltage and for providing an output signal if and only if the output of said filter is less than said DC voltage,
   f. a circuit for generating an output pulse in response to the output signal of said comparator, and means applying said output pulse to trigger said thyristor, and g. a slope regulating circuit connected to said circuit for generating an output pulse for controlling the width of said output pulse of said pulse generating circuit.

2. A device for compensating the variation in AC power source voltage as defined in claim 1 wherein said pulse generator comprises a unijunction transistor, an output pulse transformer connected in series with one of the bases of said unijunction transistor, a first capacitor connected between the emitter of said unijunction transistor and said pulse transformer, a first transistor having its collector and emitter interconnected with said second capacitor, and a second thyristor having its anode and cathode connected to the base and emitter of said first transistor, respectively, said second thyristor being connected to be triggered in response to the output of said comparator; and said slope regulating circuit comprises a resistor, a second transistor having its collector connected through said resistor to said first capacitor for charging the same, a timer, a variable resistor inserted between the base of said second transistor and said capacitor connected between the base and emitter of said second transistor.

3. In an AC voltage regulator for a welding system of the type having a welding transformer with a primary winding, AC input terminals, and controlled rectifier means connected in series between said primary winding and said input terminals, said controlled rectifier means having a control terminal; the improvement comprising phase shift means connected to said terminals for providing an AC voltage of a phase leading the phase of voltage at said terminals, low pass filter means connected to filter said phase shifted voltage, and to provide a frequency limited phase shifted AC voltage, reference voltage terminals providing a DC reference voltage, means comparing said DC voltage at said voltage terminals with the frequency limited phase shifted AC voltage output of said filter means and providing an output signal if and only if the output of said filter is less than said DC voltage, pulse generator means responsive to said signal from said comparing means for providing a pulse output, means applying said pulse output to said control terminal whereby the conduction angle of the controlled rectifier may be varied inversely with the voltage at the AC input terminals, and slope regulating means connected to said pulse generator means for further controlling the width of pulses of said pulse output.

* * * * *